US012282296B2

(12) United States Patent
Huot-Marchand et al.

(10) Patent No.: US 12,282,296 B2
(45) Date of Patent: Apr. 22, 2025

(54) METHOD FOR BONDING TIMEPIECE COMPONENTS

(71) Applicant: ETA SA Manufacture Horlogere Suisse, Grenchen (CH)

(72) Inventors: Sylvain Huot-Marchand, Eschert (CH); Marco Verardo, Les Bois (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 520 days.

(21) Appl. No.: 17/631,726

(22) PCT Filed: Jun. 9, 2020

(86) PCT No.: PCT/EP2020/065984
§ 371 (c)(1),
(2) Date: Jan. 31, 2022

(87) PCT Pub. No.: WO2021/037408
PCT Pub. Date: Mar. 4, 2021

(65) Prior Publication Data

US 2022/0276610 A1 Sep. 1, 2022

(30) Foreign Application Priority Data

Aug. 29, 2019 (EP) .................................... 19194407

(51) Int. Cl.
*G04B 15/14* (2006.01)
*G04B 17/06* (2006.01)
(Continued)

(52) U.S. Cl.
CPC ............. *G04B 15/14* (2013.01); *G04B 17/06* (2013.01); *G04B 19/103* (2013.01); *G04B 19/12* (2013.01);
(Continued)

(58) Field of Classification Search
CPC ...... G04B 15/14; G04B 17/06; G04B 19/103; G04B 19/12; G04D 3/0017; G04D 3/003;
(Continued)

(56) References Cited

U.S. PATENT DOCUMENTS

| | | | |
|---|---|---|---|
| 4,583,866 | A | 4/1986 | Kasai et al. |
| 2015/0118486 | A1 | 4/2015 | Richard et al. |
| 2017/0252765 | A1 | 9/2017 | Medard et al. |

FOREIGN PATENT DOCUMENTS

| | | | |
|---|---|---|---|
| CH | 707 993 | A2 | 10/2014 |
| CH | 707 995 | A2 | 10/2014 |

(Continued)

OTHER PUBLICATIONS

Yimin et al., “Material-Centric Bonding Technology Trend”, Rubber Reference, China Academic Journal Electronic Publishing House, Issue 8, pp. 1-11.

(Continued)

*Primary Examiner* — Robert S Walters, Jr.
(74) *Attorney, Agent, or Firm* — Oblon, McClelland, Maier & Neustadt, L.L.P.

(57) ABSTRACT

The invention relates to a method for bonding timepiece components, comprising applying an adhesive to a first and/or second timepiece component to be bonded to one another, and depositing an adhesion layer onto at least one of the first and second components to be bonded by spraying a primer composition in a localised joining area followed by the solidification of the primer composition. The adhesion layer is deposited prior to the application of the adhesive if the adhesive is applied to the one or more same components as the adhesion layer.

13 Claims, 2 Drawing Sheets

(51) Int. Cl.
*G04B 19/10* (2006.01)
*G04B 19/12* (2006.01)
*G04D 3/00* (2006.01)

(52) U.S. Cl.
CPC ........... *G04D 3/0017* (2013.01); *G04D 3/003* (2013.01); *G04D 3/0035* (2013.01); *G04D 3/0048* (2013.01); *G04D 3/0051* (2013.01)

(58) Field of Classification Search
CPC ... G04D 3/0035; G04D 3/0048; G04D 3/0051
See application file for complete search history.

(56) References Cited

FOREIGN PATENT DOCUMENTS

| | | | |
|---|---|---|---|
| CN | 103299245 | A | 9/2013 |
| CN | 104553140 | A | 4/2015 |
| CN | 106353997 | A | 1/2017 |
| CN | 109106011 | A | 1/2019 |
| EP | 2 865 737 | A1 | 4/2015 |
| FR | 1551159 | A | 12/1968 |
| JP | 5-100058 | A | 4/1993 |
| JP | 5-213057 | A | 8/1993 |
| JP | 11-118959 | A | 4/1999 |
| JP | 2008-164401 | A | 7/2008 |
| JP | 2016-188358 | A | 11/2016 |
| KR | 10-0904136 | B1 | 6/2009 |
| KR | 10-2013-0020905 | A | 3/2013 |

OTHER PUBLICATIONS

Combined Chinese Office Action and Search Report issued on Feb. 6, 2023 in Chinese Patent Application No. 202080056808.5 (with English translation of Office Action only), 9 pages.
International Search Report mailed on Oct. 6, 2020 in PCT/EP2020/065984 filed on Jun. 9, 2020 (2 pages).
Office Action issued Feb. 28, 2024, in corresponding Korean Patent Application No. 10-2022-7003972 (with English Translation), 10 pages.

METHOD FOR BONDING TIMEPIECE COMPONENTS

TECHNICAL FIELD

The present invention relates to the horological field and more particularly to a method for bonding timepiece components so as to form a one-piece assembly of timepiece components.

TECHNOLOGICAL BACKGROUND

In the horological field, some timepiece components can be assembled to one another by means of an adhesive (liquid adhesive at the time of application).

For example, in a lever escapement of a mechanical watch, pallet-stones (or "pallets", usually made of ruby) are attached to the pallet-lever by bonding, typically using a shellac dissolved in an alcohol solvent. Shellac is a natural hot-melt resin, i.e. it is honey-like at temperatures above its melting temperature ($T_m$) and solid below its melting temperature ($T_m$) or below its glass transition temperature ($T_g$). Depending on the manufacturing process of the pallet-lever, the outcome of the bonding step can be non-conform with regard to the requirements, either because the mechanical strength of the pallet-stone is insufficient or because the aesthetics of the drop exceed the specifications. In both cases, the cause of the non-conformity is often a surface tension problem.

Shellac is secreted by the female scale insect in the forests of South-East Asia. The composition of the shellac is highly dependent on the diet of the scale insects and the harvesting season. The harvested material is purified and processed, but the purity and composition obtained are never guaranteed. It is therefore very difficult, if not impossible, to guarantee consistent performance levels for this natural product over time.

On the other hand, the industrial processes are insufficiently robust to guarantee the cleanliness of the pallet-lever body and thus an unchanging surface tension. Various physical or chemical contaminations can be present, such as particles, water adsorptions or other substances, all of which affect the reaction of the surface when the shellac is deposited.

The pallet-stones are fully or partially coated with epilame as required. An epilame is a product that changes the surface tension of the substrate in one direction or another. It is usually present in the form of an invisible hydrophobic and oleophobic molecular layer, and is deposited to prevent a lubricant or the components thereof from spreading. The epilame either causes the lubricant to adhere in order to keep it in place or repels it to keep it in specific areas. The surface tension is supposed to be controlled by epilame coating. However, it has been observed that, during the epilame coating process, component cleaning operations are regularly carried out after potentially dirty manufacturing steps. Such cleaning can at least partially degrade the epilame effect, resulting in fluctuations in the surface properties at the expense of pallet-stone bonding. Conversely, high-resistance epilames can be used. However, these lead to surface tensions that are incompatible with the wetting of the surface by the shellac. In such a case, the palette cannot be bonded since the shellac will tend to escape from the epilame-coated surface.

Another example of timepiece components assembled by bonding can be found at the balance, and more specifically concerns the balance spring bonded onto the stud thereof.

One purpose of the present invention is to provide a method for preparing a timepiece component for bonding.

GENERAL DESCRIPTION OF THE INVENTION

One aspect of the invention relates to a method for bonding timepiece components, comprising applying an adhesive to a first and/or second timepiece component to be bonded to one another, and depositing an adhesion layer (dressing, adhesion primer) onto at least one of the first and second components to be bonded by spraying a primer composition in/on a localised joining area on a portion of a face of each of these first and second components. The adhesive is thus applied in such a way that a layer of adhesive is formed. This application of the adhesive, or the deposition of this layer of adhesive, is then followed by the solidification of the primer composition. It should be noted that the joining area can be referred to as the bonding area. The adhesion layer is deposited prior to the application of the adhesive if the adhesive is applied to the one or more same components as the adhesion layer and, where necessary, prior to bringing the first and second timepiece components into contact with one another.

The invention in particular proposes depositing the adhesion layer by spraying. This can be achieved, for example, by means of Aerosol Jet technology (trademark of Optomec) or by any other digital printing technology. These technologies now allow fluid materials to be deposited with a high degree of precision in terms of both volume and location. They can be adapted to timepiece components, as shown in the patent applications WO 2016/203063 and EP1172714. The present invention in particular exploits the potential for precision of this deposition technology in preparing timepiece components for bonding. By using a digitally-printed adhesion layer, the components are provided with a precisely-delimited bonding area with a surface tension that is adapted to the adhesive. This makes possible the use of more resistant epilames that are not or only slightly wettable by the adhesive to be used.

Preferably, the fluid primer composition is sprayed using a spray nozzle mounted such that it can move on a multi-axis robotic arm in order to change the orientation thereof relative to the first and/or second components on which the adhesion layer is to be formed. Alternatively, the primer composition can be sprayed substantially vertically from top to bottom using a spray nozzle, the first and/or second components on which the adhesion layer is to be formed being, in such a case, mounted such that it/they can move on a multi-axis robotic arm in order to change the orientation thereof relative to the spray nozzle. This second possibility has the advantage that the spray can remain vertical, which can facilitate precise delimitation of the adhesion layer.

The primer composition can comprise a radiation-curable material (with ultraviolet and/or electron beam radiation) and in such a case, the primer composition layer is solidified by exposure to the radiation.

The primer composition can further comprise a thermosetting material, in which case the primer composition layer is solidified by heat treatment.

The primer composition can be in the form of an ink comprising the primer composition dissolved or suspended in a solvent. The primer composition could also be in the form of a polymeric resin (with or without mineral fillers) comprising reactive diluents instead of volatile solvents.

According to one embodiment of the invention, at least one of the first and second timepiece components to be bonded to one another is coated with epilame. The adhesion layer can be formed on the timepiece component coated with epilame.

The adhesive could comprise shellac. Alternatively, the adhesive could comprise an epoxy adhesive.

According to one specific embodiment, timepiece components, at least one of which is coated with epilame, are bonded to one another using an adhesive comprising shellac. In such a case, the adhesion layer preferably has a chemical and/or physical affinity for both shellac and epilame. It should be noted that the two timepiece components could be coated with epilame.

It should be noted that the adhesive could be applied using the same technology as the adhesion layer. More specifically, the adhesive could be applied by an adhesive spray nozzle, the spray nozzle being:

- mounted such that it can move on a multi-axis robotic arm in order to change the orientation thereof relative to the first and/or second components to which the adhesive must be applied; or
- essentially vertically-oriented from top to bottom, and the first and/or second components to which adhesive must be applied being mounted such that it/they can move on a multi-axis robotic arm in order to change the orientation thereof relative to the adhesive spray nozzle.

It can be seen that various timepiece components can be bonded together thanks to the present invention. For example:

- the first timepiece component can be an escapement lever and the second timepiece component can be a lever pallet-stone,
- the first timepiece component can be a balance stud and the second timepiece component can be a balance spring,
- the first timepiece component can be a wheel plate and the second timepiece component can be a staff, for example a metal staff,
- the first timepiece component can be an index block and the second timepiece component can be a dial.

The list of components that could be bonded is not exhaustive. The invention can be used to improve the bonding of timepiece components that are already attached to one another by bonding (as is the case of the pallet-lever and its pallet-stones). However, the invention could be useful to enable the bonding of timepiece components that are currently attached by other means, (for example by clamping or riveting). Particular mention can be made of a moving plate with a fragile design (due to the thinness thereof and/or the fact that it is made of a fragile material such as silicon) on a metal (for example steel) staff. The bonding of these timepiece components would prevent or at least reduce deformation or breakage of the plate as a result of riveting or driving in operations, while guaranteeing the cohesive strength between the plate and its staff when stresses are applied thereto.

The adhesion layer could be polymer-based, for example polyurethane-, acrylate- or epoxide-based. It should be noted that for noble metals, certain products containing thiols can be used. It is understood that a person skilled in the art will choose the primer composition according to the nature of the timepiece components, and the adhesive respectively. It should be noted that in the case of polymer-based primer compositions, polymers that undergo (irreversible) cross-linking are preferred. However, with regard to the adhesive, in order to bond certain components, a thermosetting adhesive is preferable, whereas in other cases, thermoplastic adhesive is preferred.

The various aspects of the invention make it possible to improve the bonding of timepiece components, reduce the impact of dirt, use more resistant epilames and/or facilitate the application of the adhesive while respecting the quality criteria of the drop (position, quantity).

A further aspect of the invention relates to a one-piece assembly of timepiece components comprising first and second components capable of being connected to one another by such a bonding method.

According to other embodiments:

- The one-piece assembly comprises a joining part that connects the joining areas of the first and second components;
- the joining part is formed by a layer of adhesive and an adhesion layer, in particular a primer composition layer;
- the first timepiece component is an escapement lever and the second timepiece component is a lever pallet-stone;
- the first timepiece component is a balance stud and the second timepiece component is a balance spring;
- the first timepiece component is a wheel plate and the second timepiece component is a staff, and
- the first timepiece component is an index block and the second timepiece component is a dial.

Another aspect of the invention relates to a timepiece comprising such a one-piece assembly of timepiece components.

BRIEF DESCRIPTION OF THE FIGURES

Other features and characteristics of the invention will be better understood upon reading the detailed description of certain advantageous embodiments presented hereinbelow for illustration purposes, with reference to the accompanying drawings which show.

DETAILED DESCRIPTION OF EMBODIMENTS OF THE INVENTION

Figure 1:
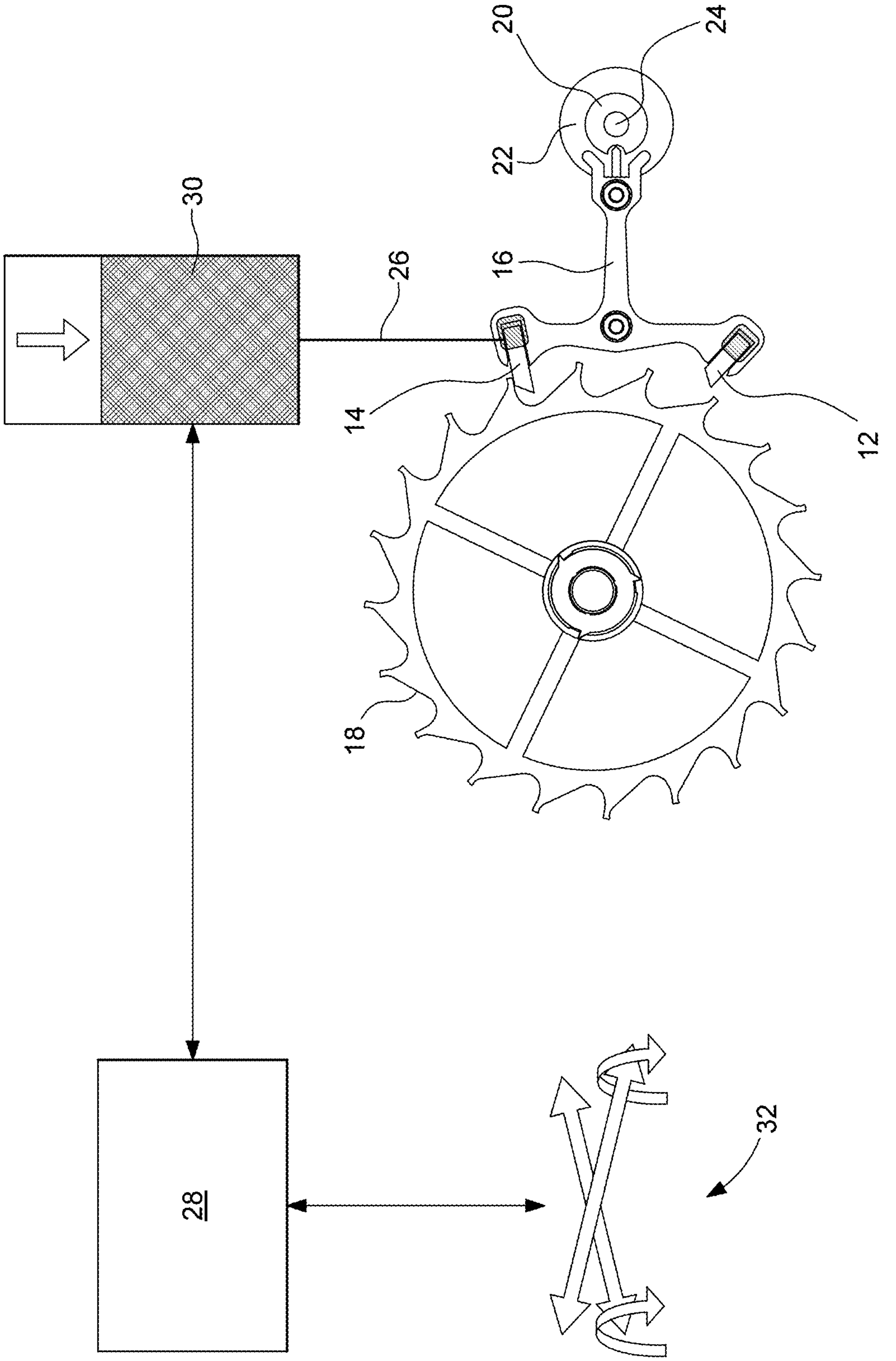
FIG. 1: the diagram of a first embodiment of a bonding method according to the invention.
Figure 2:
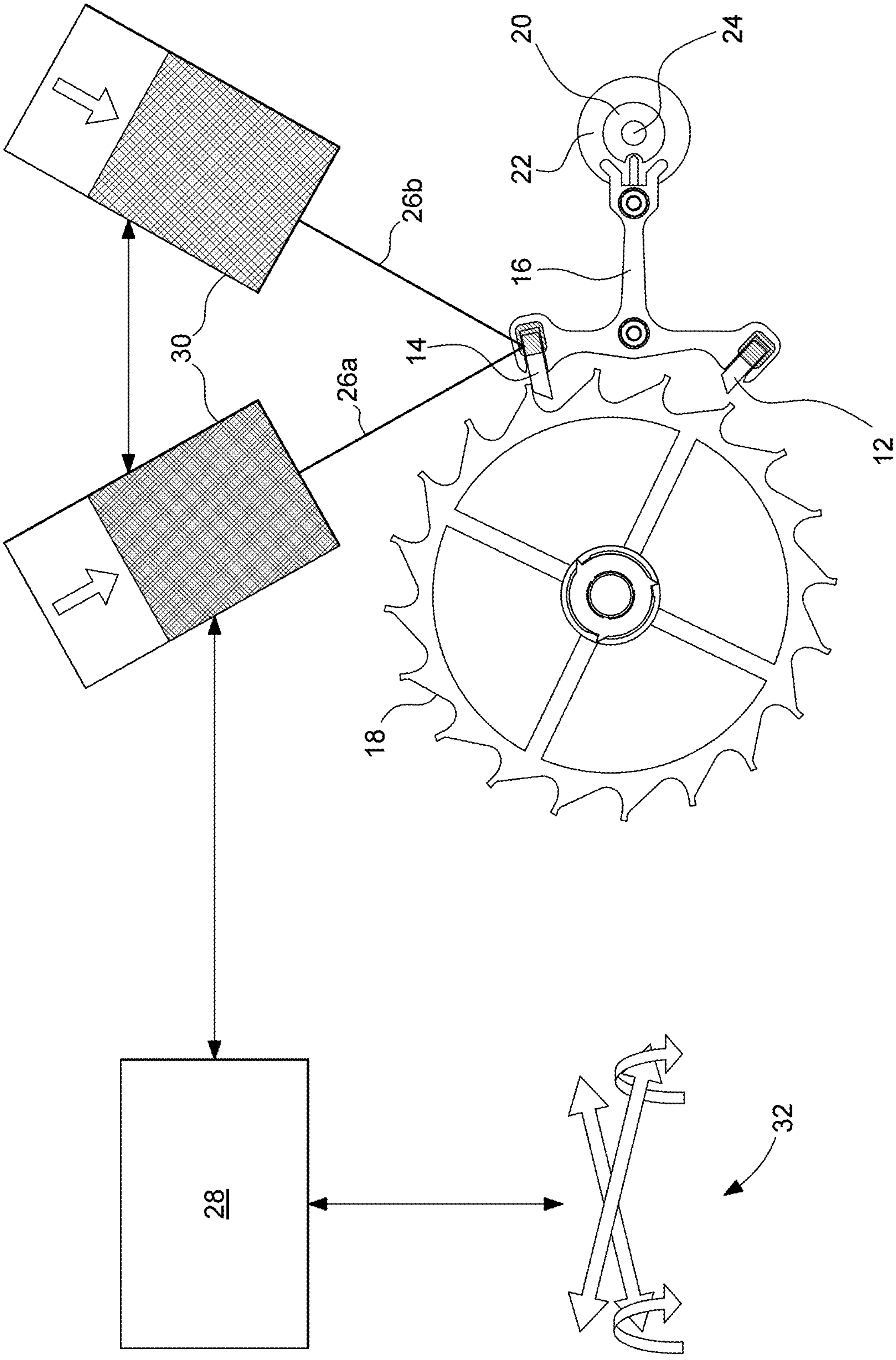
FIG. 2: the diagram of a second embodiment of a bonding method according to the invention.

FIGS. 1 and 2 diagrammatically show embodiments of a bonding method according to the invention. As discussed hereinabove, the method according to the invention can be used to bond the pallet-stones 12, 14 to the pallet-lever 16 of the escapement 10 of a mechanical watch. The figures show a Swiss lever escapement 10. It comprises an escape wheel 18, typically made of quenched, polished steel. The pallet-lever 16 connects the escape wheel to the balance (the figures showing the small roller 20, the large roller 22 and the staff 24) and can switch between two positions at the rate imposed by the balance and balance spring assembly. With each alternation, the escape wheel 18 provides an impulse to the pallet-lever 16, which transfers it to the balance so as to maintain the oscillations thereof. The pallet-stones 12, 14 are typically made of ruby, because of the hardness and low coefficient of friction thereof, and are bonded to the pallet-lever 16 by means of a shellac-based adhesive.

The pallet-stones 12, 14 are fully or partially coated with epilame as required. The invention makes it possible for high-resistance epilames to be used, since the bonding areas on the pallet-stones 12, 14 can be prepared prior to the application of the shellac using an adhesion layer, which adjusts the surface tension so as to satisfactorily allow the surface to be wet by the shellac. The adhesion layer is formed by applying a primer composition by a method for digitally printing directly on the component. In particular, the adhesion layer can be deposited by spraying the primer composition in the form of an ink 26. The amount of ink and the position of each droplet are precisely controlled by a control unit 28 (for example a microprocessor, or a computer, etc.). The control unit 28 in particular adjusts the position and orientation of the component relative to the ink spray nozzle. The possibility of orienting and positioning the spray nozzle 30 relative to the print medium is diagrammatically shown with the reference numeral 32.

The component being printed on could remain stationary during printing. In such a case, the primer composition is sprayed using a spray nozzle 30 mounted such that it can move, for example on a multi-axis robotic arm in order to change the orientation thereof relative to the component, i.e. in the case shown, the pallet-stone 12 or 14 or the pallet-lever 16. Preferably, however, the spray nozzle 30 remains vertically-oriented from top to bottom during printing, and the component is, in such a case, mounted such that it can move, for example on a multi-axis robotic arm, in order to change the orientation thereof relative to the spray nozzle 30.

According to a first alternative embodiment, after deposition on the surface of the component, the primer composition is solidified. According to a second alternative embodiment, the primer composition is solidified after the application of the adhesive onto the first and/or second timepiece components to be bonded to one another. It should be noted that, in these two alternative embodiments, the adhesion layer can be deposited prior to the application of the adhesive if the adhesive is applied to the same component as the adhesion layer. Such solidification of the primer composition contributes to ensuring strong adhesion of the timepiece components bonded to one another.

In both of these alternative embodiments, solidification is carried out as a function of the properties of the primer composition, for example by UV radiation or by electron beam in the case of a radiation-curable material, by heat treatment in the case of a thermosetting material, by laser sintering, or simply by evaporation of the solvent. It should be noted that such evaporation can be natural or forced. The curing method could combine a plurality of these possibilities, for example to accelerate curing.

In addition to the pallet-stones 12, 14, an adhesion layer can also be applied to the pallet-lever 16. The composition of the adhesion layer can be the same as that applied to the pallet-stones 12, 14, provided that the adhesion on the two types of components is strong enough. Alternatively, different adhesion layers can be used on the pallet-lever 16 and on the pallet-stones 12, 14. In this context, these pallet-stones 12, 14 and the pallet-lever 16 thus form a one-piece assembly of timepiece components.

While FIG. 1 diagrammatically shows an embodiment wherein the primer composition consists of a single fluid, FIG. 2 shows the case wherein the primer composition is a two-component composition mixed in situ. In such a case, two reactive fluids 26*a* and 26*b* are brought together on the timepiece component in the bonding area.

A further aspect of the invention relates to a one-piece assembly of timepiece components comprising first and second components capable of being connected to one another by such a method. Such a one-piece assembly comprises a joining part that connects the joining areas of the first and second components. This joining part is formed by a layer of adhesive and an adhesion layer, in particular a primer composition layer. In this one-piece assembly:

the first timepiece component is an escapement lever and the second timepiece component is a lever pallet-stone;

the first timepiece component is a balance stud and the second timepiece component is a balance spring;

the first timepiece component is a wheel plate and the second timepiece component is a staff;

the first timepiece component is an index block and the second timepiece component is a dial.

Another aspect of the invention relates to a timepiece comprising such a one-piece assembly of timepiece components.

Although specific embodiments have been described in detail, a person skilled in the art will know that various modifications and alternatives to the above can be developed in light of the general teachings of the present disclosure of the invention. As a result, the specific arrangements and/or methods described herein are intended for illustration purposes only and are not intended to limit the scope of the invention, which is determined by the scope of the accompanying claims.

The invention claimed is:

1. A method for bonding timepiece components, at least one whereof is coated with epilame, comprising:

applying an adhesive to a first and/or second timepiece component to be bonded to one another, depositing an adhesion layer onto at least one of the first and second components to be bonded by spraying a primer composition in a localised joining area of the first or second component, and solidifying the primer composition.

2. The method according to claim 1, wherein said application of the adhesive is followed by the solidification of the primer composition.

3. The method according to claim 1, wherein the adhesion layer is deposited prior to the application of the adhesive if the adhesive is applied to the same component as the adhesion layer.

4. The method according to claim 1, wherein the primer composition is sprayed using a spray nozzle mounted such that it can move on a multi-axis robotic arm in order to change the orientation thereof relative to the first and/or second components on which the adhesion layer is to be formed.

5. The method according to claim 1, wherein the primer composition is sprayed substantially vertically from top to bottom using a spray nozzle, and wherein the first and/or second components on which the adhesion layer is to be formed is/are mounted such that it/they can move on a multi-axis robotic arm in order to change the orientation thereof relative to the spray nozzle.

6. The method according to claim 1, wherein the primer composition comprises a radiation-curable material and wherein the primer composition layer is solidified by exposure to the radiation.

7. The method according to claim 1, wherein the primer composition comprises a thermosetting material and wherein the primer composition layer is solidified by heat treatment.

8. The method according to claim 1, wherein the adhesion layer is deposited on the timepiece component coated with epilame.

9. The method according to claim 1, wherein the adhesive comprises shellac.

10. The method according to claim 1, wherein the adhesive comprises shellac and wherein the adhesion layer has a chemical and/or physical affinity for both shellac and epilame.

11. The method according to claim 1, wherein the adhesive is applied by an adhesive spray nozzle, the spray nozzle being:

mounted such that it can move on a multi-axis robotic arm in order to change the orientation thereof relative to the first and/or second components to which the adhesive must be applied; or essentially vertically-oriented from top to bottom, and the first and/or second components to which adhesive must be applied being mounted such that it/they can move on a multi-axis robotic arm in order to change the orientation thereof relative to the adhesive spray nozzle.

12. The method according to claim 1, wherein the adhesion layer is polyurethane-based.

13. The method according to claim 1, wherein the primer composition consists of a single fluid or is a two-component composition mixed in-situ.

* * * * *